(12) United States Patent
Wang

(10) Patent No.: US 9,870,091 B2
(45) Date of Patent: Jan. 16, 2018

(54) TOUCH SCREEN AND DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventor: Zheng Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/233,525

(22) Filed: Aug. 10, 2016

(65) Prior Publication Data

US 2017/0242525 A1 Aug. 24, 2017

(30) Foreign Application Priority Data

Feb. 19, 2016 (CN) .......................... 2016 1 0094673

(51) Int. Cl.
*G06F 3/041* (2006.01)
*G06F 3/044* (2006.01)
(Continued)

(52) U.S. Cl.
CPC ........ *G06F 3/0416* (2013.01); *G02F 1/13338* (2013.01); *G02F 1/133514* (2013.01); *G02F 1/134309* (2013.01); *G06F 3/044* (2013.01); *G06F 3/0412* (2013.01); *G06F 3/0414* (2013.01); *G06F 2203/04103* (2013.01);
(Continued)

(58) Field of Classification Search
CPC ...... G06F 3/0416; G06F 3/044; G06F 3/0414; G06F 3/0412; G06F 2203/04105; G06F 2203/04103; G02F 1/134309; G02F 1/13338; G02F 1/133514
See application file for complete search history.

(56) References Cited

U.S. PATENT DOCUMENTS

2012/0133612 A1* 5/2012 Wang .................... G06F 3/0412
345/174
2013/0329154 A1* 12/2013 Yu ..................... G02F 1/133345
349/43

(Continued)

*Primary Examiner* — Ryan A Lubit
(74) *Attorney, Agent, or Firm* — Nath, Goldberg & Meyer; Joshua B. Goldberg; Stanley N. Protigal

(57) ABSTRACT

A touch screen comprising an array substrate, a color filter substrate, a primary emitting module, a secondary emitting module and a processor, the primary emitting module comprises a first emitting electrode and a receiving electrode both provided on a surface of the color filter substrate away from the array substrate and a first capacitance is formed therebetween; the first emitting electrode emits an excitation signal to the receiving electrode; the receiving electrode transmits the excitation signal to the processor; the secondary emitting module emits a secondary signal to the receiving electrode when a touch pressure of a finger touching the touch screen is greater than a predefined value, thus a characteristic of the excitation signal received by the receiving electrode changes; the processor processes the excitation signal to obtain the characteristic of the excitation signal and determines an intensity of the touch pressure.

20 Claims, 1 Drawing Sheet

(51) Int. Cl.
 *G02F 1/1333* (2006.01)
 *G02F 1/1335* (2006.01)
 *G02F 1/1343* (2006.01)

(52) U.S. Cl.
 CPC .............. *G06F 2203/04105* (2013.01); *G06F 2203/04111* (2013.01)

(56) References Cited

U.S. PATENT DOCUMENTS

| | | | |
|---|---|---|---|
| 2014/0043288 A1* | 2/2014 | Kurasawa | G06F 3/0412 345/174 |
| 2014/0055690 A1* | 2/2014 | Song | G02F 1/13338 349/12 |
| 2015/0378498 A1* | 12/2015 | Huie | G06F 3/0416 345/174 |
| 2016/0224147 A1* | 8/2016 | Ding | G06F 3/0412 |
| 2016/0377898 A1* | 12/2016 | Xu | G02F 1/13338 349/12 |
| 2017/0147110 A1* | 5/2017 | Xu | G06F 3/0412 |
| 2017/0153480 A1* | 6/2017 | Lv | G02F 1/13394 |
| 2017/0192277 A1* | 7/2017 | Gong | G02F 1/13394 |

* cited by examiner

TOUCH SCREEN AND DISPLAY APPARATUS

FIELD OF THE INVENTION

The present invention relates to the field of display technology, and particularly, to a touch screen and a display apparatus.

BACKGROUND OF THE INVENTION

A projective capacitive touch screen is formed by adding two groups of transparent conductive lines (along X and Y axes respectively) into a conventional capacitive touch screen, the two groups of transparent conductive lines are located in different planes respectively and perpendicular to each other. When, for example, a finger touches the touch screen, a change of capacitance at a touch position of the finger can be detected by scanning along X and Y axes, thereby the touch position of the finger is calculated.

A conventional projective capacitive touch screen comprises an array substrate and a color filter substrate which are aligned and combined with each other, liquid crystal and a main photo spacer are provided between the array substrate and the color filter substrate, wherein, for example, an emitting electrode and a receiving electrode are provided on a surface of the color filter substrate away from the array substrate, a capacitance is formed between the emitting electrode and the receiving electrode, the emitting electrode emits an excitation signal to the receiving electrode, the receiving electrode transmits the excitation signal to a processor. When a finger touches the surface of the touch screen, the capacitance between the emitting electrode and the receiving electrode changes, resulting in a change of characteristic of the excitation signal received by the receiving electrode, the changed excitation signal processed by the processor can be used for identifying a touch action of the finger.

However, the projective capacitive touch screen described above can only identify the touch action of the finger, but cannot identify different touch pressures of the finger, that is, cannot perceive whether the finger presses the touch screen lightly or heavily.

SUMMARY OF THE INVENTION

In view of one of problems existing in the prior art, an object of the present invention is to provide a touch screen and a display apparatus comprising the touch screen, which can determine a touch intensity of a finger while identifying a touch action of the finger, thus can trigger different function controls in accordance with different touch intensities.

In order to achieve the object as above, embodiments of the present invention provide a touch screen, comprising an array substrate and a color filter substrate which are aligned and combined with each other, liquid crystal and a main photo spacer are provided between the array substrate and the color filter substrate, the touch screen further comprises a primary emitting module, a secondary emitting module and a processor, wherein, the primary emitting module comprises a first emitting electrode and a receiving electrode, the first emitting electrode and the receiving electrode are provided on a surface of the color filter substrate away from the array substrate, and a first capacitance is formed between the first emitting electrode and the receiving electrode, the first emitting electrode is configured to emit an excitation signal to the receiving electrode, the receiving electrode is configured to transmit the excitation signal to the processor; the secondary emitting module is configured to emit a secondary signal to the receiving electrode when a finger touches the touch screen and a touch pressure of the finger is greater than a predefined value, so that a characteristic of the excitation signal received by the receiving electrode changes; and the processor is configured to process the excitation signal to obtain the characteristic of the excitation signal and determine an intensity of the touch pressure of the finger in accordance with the characteristic of the excitation signal.

Preferably, the secondary emitting module comprises a first conductive component, a second conductive component and a second emitting electrode, wherein, the second emitting electrode, a protective layer and a black matrix are successively provided on a surface of the array substrate closer to the color filter substrate along a direction away from the array substrate, the first conductive component and the second conductive component are opposite to each other and respectively provided on a surface of the color filter substrate closer to the array substrate and a surface of the black matrix closer to the color filter substrate, and the second conductive component successively penetrates through the black matrix and the protective layer and is electrically connected with the second emitting electrode; the first conductive component and the second conductive component are not in contact when the finger touches the touch screen and the touch pressure of the finger is not greater than the predefined value, and are in contact when the finger touches the touch screen and the touch pressure of the finger is greater than the predefined value, so that a second capacitance is formed between the first conductive component and the first emitting electrode, and a third capacitance is formed between the first conductive component and the receiving electrode; and the second emitting electrode is configured to emit the secondary signal to the receiving electrode through the second capacitance and the third capacitance when the finger touches the touch screen and the touch pressure of the finger is greater than the predefined value.

Preferably, the first conductive component comprises an auxiliary photo spacer and a first conductive layer, wherein, the auxiliary photo spacer is provided on the surface of the color filter substrate closer to the array substrate, and projections of the auxiliary photo spacer and the first emitting electrode on the color filter substrate at least partially overlap; the first conductive layer comprises a first contact part covering an end of the auxiliary photo spacer away from the color filter substrate, and a capacitive electrode opposite to the first emitting electrode, the capacitive electrode extends from the first contact part to the surface of the color filter substrate closer to the array substrate along a side wall of the auxiliary photo spacer; the second conductive component comprises a second conductive layer, and the second conductive layer comprises a second contact part which is provided on a surface of the black matrix away from the array substrate and opposite to the first contact part of the first conductive layer, and a connection part successively penetrating through the black matrix and the protective layer and electrically connected with the second emitting electrode; and the first contact part and the second contact part are not in contact when the finger touches the touch screen and the touch pressure of the finger is not greater than the predefined value, and are in contact when the finger touches the touch screen and the touch pressure of the finger is greater than the predefined value, so that a second capacitance is formed between the capacitive electrode and the first emitting electrode, and a third capacitance is formed between the capacitive electrode and the receiving electrode.

Preferably, the first conductive layer and the second conductive layer are ITO film layers.

Preferably, a through-hole is formed in the black matrix and the protective layer by an etching process for the connection part of the second conductive layer passing through.

Preferably, after forming the through-hole, the second conductive layer is formed by a depositing process, so that the second contact part and the connection part are formed simultaneously.

Preferably, the second emitting electrode is formed while a gate of the array substrate is formed, and the second emitting electrode is in parallel with the gate and located at a side of the gate.

Preferably, an excitation timing in which the secondary emitting sequence module emits the secondary signal and an excitation timing sequence in which the first emitting electrode emits the excitation signal are staggered from each other.

As another technical solution, embodiments of the present invention provide a display apparatus comprising the touch screen of the present invention as above.

The present invention has following beneficial effects.

By using the touch screen provided by embodiments of the present invention, when a finger touches the touch screen and the touch pressure of the finger is not greater than the predefined value, the characteristic of the excitation signal received by the receiving electrode in the primary emitting module changes, and the secondary emitting module is not triggered, and when the finger touches the touch screen and the touch pressure of the finger is greater than the predefined value, the secondary emitting module emits a secondary signal to the receiving electrode, so that the characteristic of the excitation signal received by the receiving electrode changes, the processor processes the excitation signal to obtain the characteristic of the excitation signal and determines the intensity of the touch pressure of the finger in accordance with the characteristic of the excitation signal. Thus, the touch screen provided by embodiments of the present invention can determine the touch intensity of the finger while identifying the touch action of the finger, thereby can trigger different function controls in accordance with different touch intensities.

The display apparatus provided by embodiments of the present invention employs the touch screen provided by embodiments of the present invention, thus also can determine the touch intensity of the finger while identifying the touch action of the finger, thereby can trigger different function controls in accordance with different touch intensities.

DETAILED DESCRIPTION OF EMBODIMENTS

Hereinafter, the touch screen and the display apparatus provided by the present invention will be described in detail in conjunction with accompanying drawings so that persons skilled in the art can understand technical solutions of the present invention better.

Figure 1:
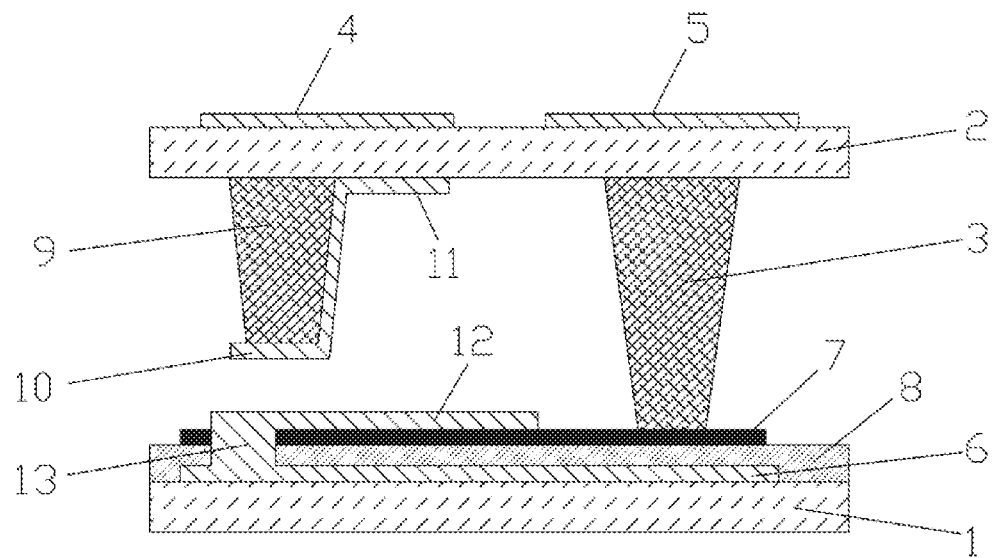
FIG. 1 shows a cross-sectional view of a touch screen in an embodiment of the present invention.
Figure 2:
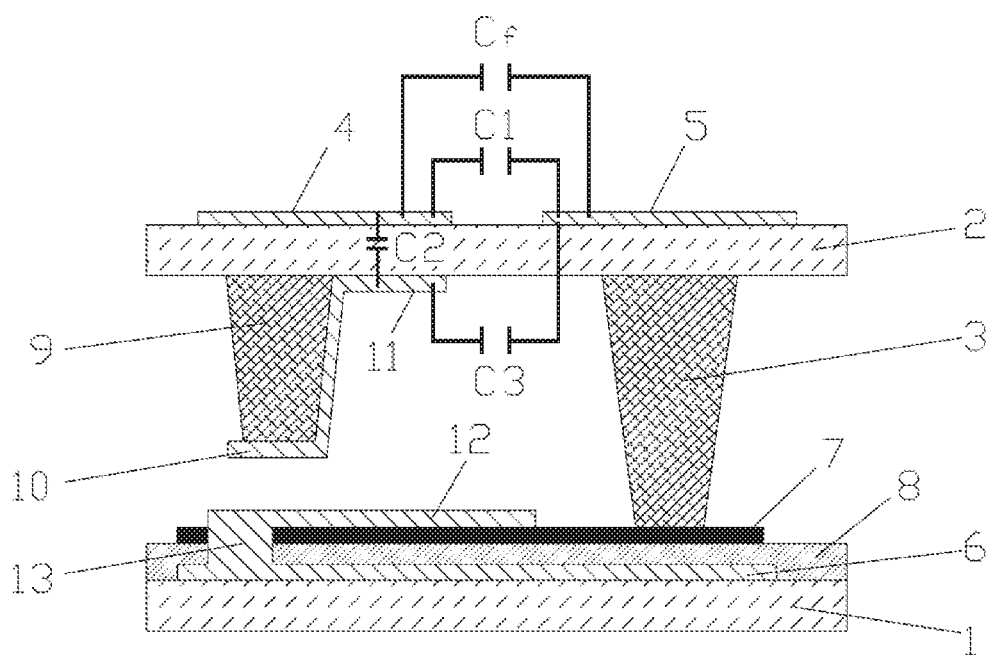
FIG. 2 shows a cross-sectional view of a touch screen being touched by a finger in an embodiment of the present invention.

FIG. 1 shows a cross-sectional view of a touch screen in an embodiment of the present invention. FIG. 2 shows a cross-sectional view of a touch screen being touched by a finger in an embodiment of the present invention. Referring to FIGS. 1 and 2, the touch screen comprises an array substrate 1, a color filter substrate 2, a primary emitting module, a secondary emitting module and a processor (not shown in the figures).

In the present embodiment, the array substrate 1 and the color filter substrate 2 are aligned and combined with each other, and liquid crystal (not shown in the figures) and a main photo spacer 3 are provided between the array substrate 1 and the color filter substrate 2. The primary emitting module comprises a first emitting electrode 4 and a receiving electrode 5, the first emitting electrode 4 and the receiving electrode 5 are provided on a surface of the color filter substrate 2 away from the array substrate 1, and a first capacitance C1 is formed between the first emitting electrode 4 and the receiving electrode 5. The first emitting electrode 4 is configured to emit an excitation signal to the receiving electrode 5, and the receiving electrode 5 is configured to transmit the excitation signal to the processor. The secondary emitting module is configured to emit a secondary signal to the receiving electrode 5 when a finger touches the touch screen and a touch pressure of the finger is greater than a predefined value, thus a characteristic of the excitation signal received by the receiving electrode 5 changes. The processor is configured to process the excitation signal to obtain the characteristic of the excitation signal and determine an intensity of the touch pressure of the finger in accordance with the characteristic of the excitation signal, that is, judge whether the touch pressure of the finger is greater than the predefined value or not.

In the present embodiment, the secondary emitting module comprises a first conductive component, a second conductive component and a second emitting electrode 6, wherein, the second emitting electrode 6, a protective layer 8 and a black matrix 7 are successively provided on a surface of the array substrate 1 closer to the color filter substrate 2 along a direction away from the array substrate 1.

The first conductive component and the second conductive component are opposite to each other and respectively provided on a surface of the color filter substrate 2 closer to the array substrate 1 and a surface of the black matrix 7 closer to the color filter substrate 2, and the second conductive component successively penetrates through the black matrix 7 and the protective layer 8 and is electrically connected with the second emitting electrode 6. Specifically, the first conductive component comprises an auxiliary photo spacer 9 and a first conductive layer, wherein, the auxiliary photo spacer 9 is provided on the surface of the color filter substrate 2 closer to the array substrate 1, and is located at a position corresponding to the first emitting electrode 4 (that is, projections of the auxiliary photo spacer 9 and the first emitting electrode 4 on the color filter substrate 2 at least partially overlap), the first conductive layer comprises a first contact part 10 covering an end of the auxiliary photo spacer 9 away from the color filter substrate 2, and a capacitive electrode 11 opposite to the first emitting electrode 4. The capacitive electrode 11 extends from the first contact part 10 to a conductive layer on the surface of the color filter substrate 2 closer to the array substrate 1 along a side wall of the auxiliary photo spacer 9. The second conductive component comprises a second conductive layer, and the second conductive layer comprises a second contact part 12 which is provided on a surface of the black matrix 7 away from the array substrate 1 and opposite to the first contact part 10 of the first conductive layer, and a connection part 13 successively penetrating through the black matrix 7 and the protective layer 8 and electrically connected with the second emitting electrode 6.

Moreover, the first contact part 10 and the second contact part 12 are not in contact when the finger touches the touch screen and the touch pressure of the finger is not greater than the predefined value, that is to say, a length of the auxiliary photo spacer 9 in a direction perpendicular to the array substrate 1 is smaller than a distance between the array substrate 1 and the color filter substrate 2 in a direction perpendicular to the array substrate 1.

When the finger touches the touch screen and the touch pressure of the finger is greater than the predefined value, the first contact part 10 and the second contact part 12 are in contact, thus the first conductive layer comprising the first contact part 10 and the capacitive electrode 11 is electrically connected to the second emitting electrode 6 through the second contact part 12 and the connection part 13. Therefore, a second capacitance C2 is formed between the capacitive electrode 11 and the first emitting electrode 4, and a third capacitance C3 is formed between the capacitive electrode 11 and the receiving electrode 5. In this case, the second emitting electrode 6 emits the secondary signal to the receiving electrode 5 through the second capacitance C2 and the third capacitance C3, so that the characteristic of the excitation signal received by the receiving electrode 5 changes.

In the primary emitting module, the first emitting electrode 4 always emits the excitation signal to the receiving electrode 5. When the finger touches the touch screen and the touch pressure of the finger is not greater than the predefined value (that is, the touch intensity of the finger touching the touch screen is small), since a finger capacitance $C_f$ is additionally formed between the first emitting electrode 4 and the receiving electrode 5, the characteristic of the excitation signal received by the receiving electrode 5 changes, this change is processed by the processor for determining that the touch pressure of the finger is small, correspondingly, this touch may be referred to as a first level touch. In this case, since the touch pressure of the finger is small, the first contact part 10 and the second contact part 12 are not in contact, and the secondary emitting module is not triggered.

When the finger touches the touch screen and the touch pressure of the finger is greater than the predefined value, the first touch part 10 and the second touch part 12 are in contact, thus the first conductive layer comprising the first contact part 10 and the capacitive electrode 11 is electrically connected to the second emitting electrode 6 through the second contact part 12 and the connection part 13. Thus, a second capacitance C2 is formed between the capacitive electrode 11 and the first emitting electrode 4, and a third capacitance C3 is formed between the capacitive electrode 11 and the receiving electrode 5. The second emitting electrode 6 emits the secondary signal to the receiving electrode 5 through the second capacitance C2 and the third capacitance C3 so that the characteristic of the excitation signal received by the receiving electrode 5 changes. The excitation signal is processed by the processor for determining that the touch pressure of the finger is large, correspondingly, this touch may be referred to as a second level touch.

Therefore, the touch screen of the present embodiment can determine the touch intensity of the finger while identifying the touch action of the finger, thus can trigger different function controls in accordance with different touch intensities.

It should be noted that, the first conductive layer and the second conductive layer are not limited to the above structures in the present embodiment, and in practical applications, the object of the present invention can be achieved, as long as the first conductive layer and the second conductive layer are not in contact when the finger touches the touch screen and the touch pressure of the finger is not greater than the predefined value, and are in contact when the finger touches the touch screen and the touch pressure of the finger is greater than the predefined value, while the second capacitance is formed between the first conductive layer and the first emitting electrode, and the third capacitance is formed between the first conductive layer and the receiving electrode.

Preferably, the first conductive layer and the second conductive layer are ITO film layers.

Preferably, a through-hole may be formed in the black matrix 7 and the protective layer 8 by an etching process, so that the connection part 13 of the second conductive layer is electrically connected with the second emitting electrode 6 through the through-hole.

Preferably, after forming the through-hole, the second conductive layer may be formed by a depositing process, so that the second contact part 12 and the connection part 13 are formed simultaneously.

Preferably, the second emitting electrode 6 is formed while a gate (not shown in the figures) is formed on the array substrate 1, and the second emitting electrode 6 may be in parallel with the gate and located at a side of the gate.

Preferably, an excitation timing sequence in which the second emitting electrode 6 in the secondary emitting module emits the secondary signal and an excitation timing sequence in which the first emitting electrode 4 emits the excitation signal are staggered from each other, facilitating the processor to identify the characteristic of the excitation signal.

Main manufacturing steps of the touch screen provided by embodiments of the present invention will be described below. Specifically, the main manufacturing steps include:

1) while forming the gate on the array substrate 1, forming the second emitting electrode 6 in parallel with the gate;

2) forming the protective layer 8 above the second emitting electrode 6;

3) forming the black matrix 7 above the protective layer 8;

4) forming the through-hole in the black matrix 7 and the protective layer 8 by an etching process;

5) forming the second conductive layer by a depositing process so as to form the second contact part 12 and the connection part 13 simultaneously;

6) forming a main photo spacer 3 to be provided between the color filter substrate 2 and the array substrate 1, and forming the auxiliary photo spacer 9 on the surface of the color filter substrate 2 to be closer to the array substrate 1, wherein, the length of the auxiliary photo spacer 9 in the direction perpendicular to the array substrate 1 is smaller than the distance between array substrate 1 and the color filter substrate 2, which are aligned and combined with each other, in the direction perpendicular to the array substrate 1, and the length of the main photo spacer 3 in the direction perpendicular to the array substrate 1 is equal to the distance between the array substrate 1 and the color filter substrate 2, which are aligned and combined with each other, in the direction perpendicular to the array substrate 1, to play a supporting role, that is to say, the length of the auxiliary photo spacer 9 in the direction perpendicular to the array substrate 1 is smaller than the length of the main photo spacer 3 in the direction perpendicular to the array substrate 1, wherein, the main photo spacer 3 may be formed independently and then adhered between the array substrate 1 and the color filter substrate 2, or may be formed on the surface of the color filter substrate 2 to be closer to the array substrate 1 (e.g., formed along with the auxiliary photo spacer 9 in a single process), which is not limited hereto;

7) forming the first conductive layer on the end of the auxiliary photo spacer 9 away from the color filter substrate 2 by a depositing process, and then forming a required pattern by an exposure and etching process;

8) coating an alignment layer selectively, so that the second contact part 12, and the first contact part 10 and the capacitive electrode 11 of the first conductive layer are not covered by the alignment layer;

9) forming the first emitting electrode 4 and the receiving electrode 5 of a projective capacitance on the surface of the color filter substrate 2 to be away from the array substrate 1 by a conventional process;

10) aligning and combining the array substrate 1 and the color filter substrate 2.

As above, by using the touch screen provided by embodiments of the present invention, when a finger touches the touch screen and the touch pressure of the finger is not greater than the predefined value, the characteristic of the excitation signal received by the receiving electrode in the primary emitting module changes, and the secondary emitting module is not triggered, and when the finger touches the touch screen and the touch pressure of the finger is greater than the predefined value, the secondary emitting module emits a secondary signal to the receiving electrode, so that the characteristic of the excitation signal received by the receiving electrode changes, the processor processes the excitation signal to obtain the characteristic of the excitation signal and determines the intensity of the touch pressure of the finger in accordance with the characteristic of the excitation signal. Thus, the touch screen provided by embodiments of the present invention can determine the touch intensity of the finger while identifying the touch action of the finger, thereby can trigger different function controls in accordance with different touch intensities.

As another technical solution, embodiments of the present invention provide a display apparatus comprising the touch screen of the present invention as above.

The display apparatus provided by embodiments of the present invention employs the touch screen provided by embodiments of the present invention, thus also can determine the touch intensity of the finger while identifying the touch action of the finger, thereby can trigger different function controls in accordance with different touch intensities.

It should be understood that, the above embodiments are only exemplary embodiments used for explaining the principle of the present invention, but not to limit the present invention. A person skilled in the art can make various variations and modifications without departing from spirit and scope of the present invention, and the variations and the modifications are also considered to be within the protection scope of the present invention.

The invention claimed is:

1. A touch screen, comprising an array substrate and a color filter substrate which are aligned and combined with each other, liquid crystal and a main photo spacer are provided between the array substrate and the color filter substrate, the touch screen further comprises a primary emitting module, a secondary emitting module and a processor, wherein, the primary emitting module comprises a first emitting electrode and a receiving electrode, the first emitting electrode and the receiving electrode are provided on a surface of the color filter substrate away from the array substrate, and a first capacitance is formed between the first emitting electrode and the receiving electrode, the first emitting electrode is configured to emit an excitation signal to the receiving electrode, the receiving electrode is configured to transmit the excitation signal to the processor;

the secondary emitting module is provided between the color filter substrate and the array substrate, comprises a black matrix, and is configured to emit a secondary signal to the receiving electrode when a finger touches the touch screen and a touch pressure of the finger is greater than a predefined value, so that a characteristic of the excitation signal received by the receiving electrode changes; and the processor is configured to process the excitation signal to obtain the characteristic of the excitation signal and determine an intensity of the touch pressure of the finger in accordance with the characteristic of the excitation signal.

2. The touch screen of claim 1, wherein the secondary emitting module comprises a first conductive component, a second conductive component and a second emitting electrode, wherein, the second emitting electrode, a protective layer and the black matrix are successively provided on a surface of the array substrate closer to the color filter substrate along a direction away from the array substrate, the first conductive component and the second conductive component are opposite to each other and respectively provided on a surface of the color filter substrate closer to the array substrate and a surface of the black matrix closer to the color filter substrate, and the second conductive component successively penetrates through the black matrix and the protective layer and is electrically connected with the second emitting electrode;

the first conductive component and the second conductive component are not in contact when the finger touches the touch screen and the touch pressure of the finger is not greater than the predefined value, and are in contact when the finger touches the touch screen and the touch pressure of the finger is greater than the predefined value, so that a second capacitance is formed between the first conductive component and the first emitting electrode, and a third capacitance is formed between the first conductive component and the receiving electrode; and the second emitting electrode is configured to emit the secondary signal to the receiving electrode through the second capacitance and the third capacitance when the finger touches the touch screen and the touch pressure of the finger is greater than the predefined value.

3. The touch screen of claim 2, wherein, the first conductive component comprises an auxiliary photo spacer and a first conductive layer, wherein, the auxiliary photo spacer is provided on the surface of the color filter substrate closer to the array substrate, and projections of the auxiliary photo spacer and the first emitting electrode on the color filter substrate at least partially overlap;

the first conductive layer comprises a first contact part covering an end of the auxiliary photo spacer away from the color filter substrate, and a capacitive electrode opposite to the first emitting electrode, the capacitive electrode extends from the first contact part to the surface of the color filter substrate closer to the array substrate along a side wall of the auxiliary photo spacer;

the second conductive component comprises a second conductive layer, and the second conductive layer comprises a second contact part which is provided on a surface of the black matrix away from the array substrate and opposite to the first contact part of the first conductive layer, and a connection part successively penetrating through the black matrix and the protective layer and electrically connected with the second emitting electrode; and the first contact part and the second contact part are not in contact when the finger touches the touch screen and the touch pressure of the finger is not greater than the predefined value, and are in contact when the finger touches the touch screen and the touch pressure of the finger is greater than the predefined value, so that a second capacitance is formed between the capacitive electrode and the first emitting electrode, and a third capacitance is formed between the capacitive electrode and the receiving electrode.

4. The touch screen of claim 3, wherein the first conductive layer and the second conductive layer are ITO film layers.

5. The touch screen of claim 3, wherein a through-hole is formed in the black matrix and the protective layer by an etching process for the connection part of the second conductive layer passing through.

6. The touch screen of claim 5, wherein, after forming the through-hole, the second conductive layer is formed by a depositing process, so that the second contact part and the connection part are formed simultaneously.

7. The touch screen of claim 2, wherein, the second emitting electrode is formed while a gate of the array substrate is formed, and the second emitting electrode is in parallel with the gate and located at a side of the gate.

8. The touch screen of claim 1, wherein an excitation timing sequence in which the secondary emitting module emits the secondary signal and an excitation timing sequence in which the first emitting electrode emits the excitation signal are staggered from each other.

9. The touch screen of claim 2, wherein an excitation timing sequence in which the secondary emitting module emits the secondary signal and an excitation timing sequence in which the first emitting electrode emits the excitation signal are staggered from each other.

10. The touch screen of claim 3, wherein an excitation timing sequence in which the secondary emitting module emits the secondary signal and an excitation timing sequence in which the first emitting electrode emits the excitation signal are staggered from each other.

11. The touch screen of claim 4, wherein an excitation timing sequence in which the secondary emitting module emits the secondary signal and an excitation timing sequence in which the first emitting electrode emits the excitation signal are staggered from each other.

12. The touch screen of claim 5, wherein an excitation timing sequence in which the secondary emitting module emits the secondary signal and an excitation timing sequence in which the first emitting electrode emits the excitation signal are staggered from each other.

13. A display apparatus, comprising the touch screen of claim 1.

14. The display apparatus of claim 13, wherein the secondary emitting module comprises a first conductive component, a second conductive component and a second emitting electrode, wherein, the second emitting electrode, a protective layer and the black matrix are successively provided on a surface of the array substrate closer to the color filter substrate along a direction away from the array substrate, the first conductive component and the second conductive component are opposite to each other and respectively provided on a surface of the color filter substrate closer to the array substrate and a surface of the black matrix closer to the color filter substrate, and the second conductive component successively penetrates through the black matrix and the protective layer and is electrically connected with the second emitting electrode;

the first conductive component and the second conductive component are not in contact when the finger touches the touch screen and the touch pressure of the finger is not greater than the predefined value, and are in contact when the finger touches the touch screen and the touch pressure of the finger is greater than the predefined value, so that a second capacitance is formed between the first conductive component and the first emitting electrode, and a third capacitance is formed between the first conductive component and the receiving electrode; and the second emitting electrode is configured to emit the secondary signal to the receiving electrode through the second capacitance and the third capacitance when the finger touches the touch screen and the touch pressure of the finger is greater than the predefined value.

15. The display apparatus of claim 14, wherein, the first conductive component comprises an auxiliary photo spacer and a first conductive layer, wherein, the auxiliary photo spacer is provided on the surface of the color filter substrate closer to the array substrate, and projections of the auxiliary photo spacer and the first emitting electrode on the color filter substrate at least partially overlap;

the first conductive layer comprises a first contact part covering an end of the auxiliary photo spacer away from the color filter substrate, and a capacitive electrode opposite to the first emitting electrode, the capacitive electrode extends from the first contact part to the surface of the color filter substrate closer to the array substrate along a side wall of the auxiliary photo spacer;

the second conductive component comprises a second conductive layer, and the second conductive layer comprises a second contact part which is provided on a surface of the black matrix away from the array substrate and opposite to the first contact part of the first conductive layer, and a connection part successively penetrating through the black matrix and the protective layer and electrically connected with the second emitting electrode; and the first contact part and the second contact part are not in contact when the finger touches the touch screen and the touch pressure of the finger is not greater than the predefined value, and are in contact when the finger touches the touch screen and the touch pressure of the finger is greater than the predefined value, so that a second capacitance is formed between the capacitive electrode and the first emitting electrode, and a third capacitance is formed between the capacitive electrode and the receiving electrode.

16. The display apparatus of claim 15, wherein the first conductive layer and the second conductive layer are ITO film layers.

17. The display apparatus of claim 15, wherein a through-hole is formed in the black matrix and the protective layer by an etching process for the connection part of the second conductive layer passing through.

18. The display apparatus of claim 17, wherein, after forming the through-hole, the second conductive layer is formed by a depositing process, so that the second contact part and the connection part are formed simultaneously.

19. The display apparatus of claim 14, wherein, the second emitting electrode is formed while a gate of the array substrate is formed, and the second emitting electrode is in parallel with the gate and located at a side of the gate.

20. The display apparatus of claim 13, wherein an excitation timing sequence in which the secondary emitting module emits the secondary signal and an excitation timing sequence in which the first emitting electrode emits the excitation signal are staggered from each other.

* * * * *